July 29, 1941.                L. A. SAFFORD                2,250,653
                         BLANK FOR HOSE CLAMPS
                          Filed July 19, 1939
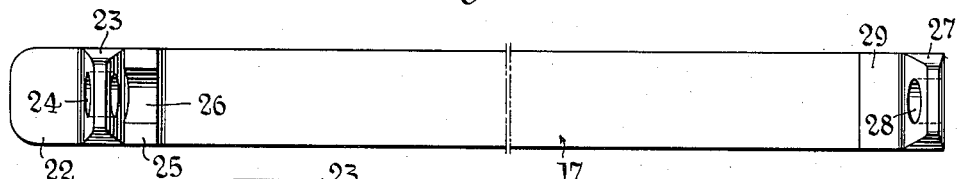
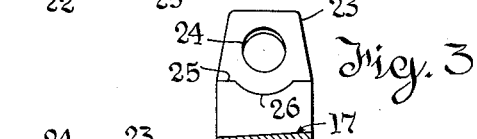
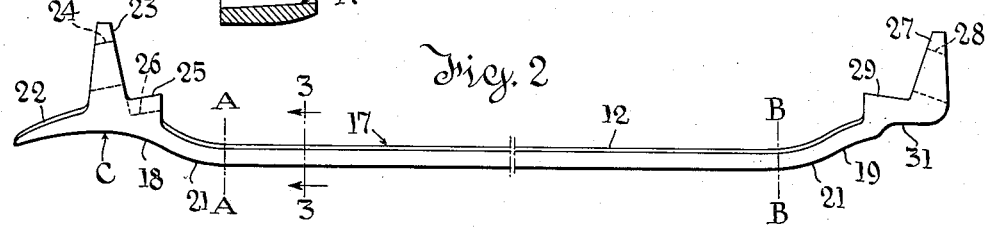
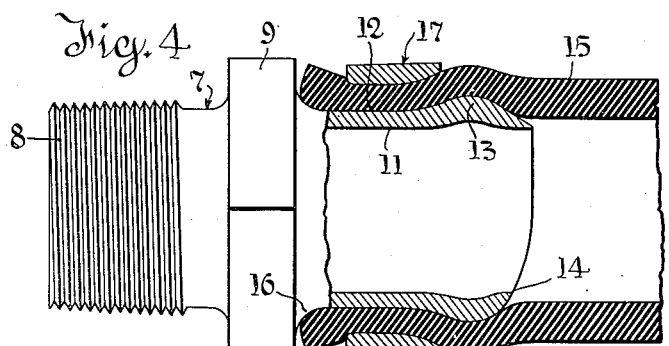
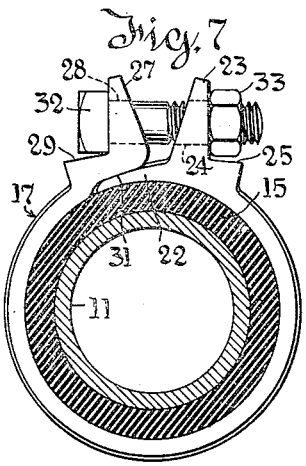
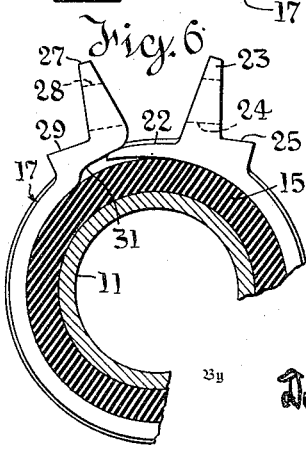
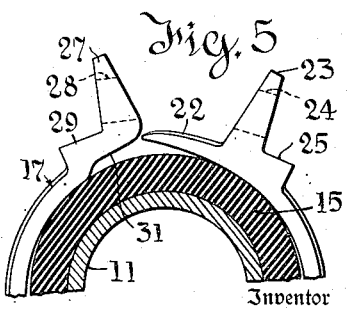
Inventor
Lewis A. Safford
Attorneys Patented July 29, 1941

2,250,653

UNITED STATES PATENT OFFICE 2,250,653

BLANK FOR HOSE CLAMPS

Lewis A. Safford, Watertown, N. Y., assignor to The New York Air Brake Company, a corporation of New Jersey Application July 19, 1939, Serial No. 285,442

5 Claims. (Cl. 29—148)

This invention relates to clamps for hose and particularly to clamp bands for use with air brake hose.

Air brake hose is a very heavy fabric-reinforced rubber hose which is attached to a nipple on the end of the brake pipe and attached to a nipple on one of the separable hose connectors at each end of a railroad car. The separable connectors are designed to be pulled apart if two cars are uncoupled under certain conditions, and this often results in destructive stresses upon the hose, particularly where the hose engages the nipple.

The patent to Terwilliger et al., 1,853,473, issued April 12, 1932, represents the best effort heretofore made to avoid destructive stresses on air brake hose. The present invention is in the nature of an improvement on the Terwilliger invention.

Terwilliger makes use of a nipple having a rounded bulbous portion adjacent its end, the nipple having a rounded extremity intended to avoid cutting of the lining of the hose. With a nipple of this sort, Terwilliger proposes the use of a clamp band which is so tapered in cross section that the inner contour of the band when in place is approximately, but only approximately, parallel with the flaring portion of the nipple. One objection to the Terwilliger band is that because of the tapered cross section the median plane of the band is a cone when the band is bent to circular form. Hence, the band must be forged in curved or arcuate form when viewed from its wide or flat side. This greatly increases the cost of the forging dies.

According to the present invention, the nipple has a cylindrical portion of substantial extent behind the bulbous enlargement and the two merge through a flaring portion of very gradual curvature. The band, when bent to form, is internally cylindrical for half or more than half of its width and then flares outwardly gradually on its inner surface. When the band is bent to circular form the outer surface is slightly conical. Thus, the curvature of the inner surface of the band is made to conform accurately to the contour of the nipple, for the band has a cylindrical portion encircling a cylindrical portion of the nipple and a gradually flaring internal portion opposite the flaring portion of the nipple. The peculiar cross section of the band (see Fig. 3) is selected to make it possible to forge the blank for the band as a straight strip when viewed from its flat side. When viewed from the edge, the blank is straight only in the middle portion, the ends, because they are stiffened by the bolt lugs, being formed to the final curvature. One end portion carries an arcuate bendable tongue of special form and the other end portion is curved to form a camming seat which forces the tongue inward as the clamp band is contracted around the hose, causing the tongue to flex inward and close upon the hose rather than to slide over it.

The bolting lugs are quite massive and the lug adjacent the camming seat is sustained and reinforced by the tongue just mentioned when the latter enters.

A band so formed may be bent around a former having a contour which conforms to the desired internal contour of the band, and because the curves at the end are preformed, will readily assume the desired configuration.

A preferred embodiment of the invention will now be described with reference to the accompanying drawing in which:

Figure 1 is a face view of the clamp band as forged. A portion of the middle has been broken away to reduce the length of the view.

Figure 2 is an edge view of the band shown in Figure 1 drawn on the same scale with the middle portion similarly broken away.

Figure 3 is a section on the line 3—3 of Figure 2.

Figure 4 is a view partly in elevation and partly in axial section of the improved nipple with the hose in place clamped by the improved type of band.

Figures 5, 6 and 7 are transverse sectional views showing how the band closes over the hose and how the tongue is flexed when the band is contracted around the hose and nipple.

Referring first to Figure 4, the hose nipple represented generally at 7 is externally pipe threaded at 8 for connection with a brake pipe, hose coupling, or any other suitable ported element.

The part 9 is the hexagonal wrench grip by which the nipple is turned and 11 is the nipple proper projecting beyond the wrench grip and having a generally cylindrical portion at 12 which merges into the bulbous portion 13. This is formed at the end as indicated at 14 (Fig. 4) so that the hose may be forced over the bulbous end of the nipple and be expanded thereby as indicated. The configuration of the end is such as to minimize the danger of damage to the hose when couplings are pulled apart. The cylindrical portion 12 terminates adjacent the wrench grip 9 in a fillet 16 of substantial radius.

After the hose is in position on the nipple, it is clamped by a band indicated generally by the numeral 17. The cross section of this band, as clearly shown in Figure 4, is then such that the band is internally cylindrical for more than half of its width and tapers or flares outwardly on its inner face for the remainder of the inner surface so that the internal contour of the band conforms to the external contour of the hose when in position on the nipple and generally is parallel with the cylindrical portion 12 thereof and conforms to the flare leading from such cylindrical portion to the bulbous enlargement 13.

From this it follows that the band compresses the hose 15 uniformly throughout the area of engagement. The middle portion of the band 17 is forged as a straight strip as viewed in Figure 1. The middle portion, between the lines A—A and B—B is straight as viewed in Figure 2. The cross section of this straight portion is indicated in Figure 3. The face which becomes the outer face of the band is slightly inclined or skewed relatively to the end lugs (see lug 23). The section is clearly shown in Figure 3. This configuration causes a band forged straight at its middle to assume the desired internal form when bent around a cylindrical mandrel.

Beyond the line A—A and beyond the line B—B are two portions 18 and 19, the inner faces of which are initially formed to a radius conforming to the final closed circular curvature of the clamp. These curves at 18 and 19 are formed in the forging operation and merge into the straight middle portion by reverse curves indicated generally at 21. The design is such that when the forged blank is bent around a cylindrical mandrel the entire interior curve will approximate a true circle very closely. The exact form of the blank depends on the size and form of the bolting lugs.

The curve 18 continues to a point "C" which is the root of a projecting tongue member 22. Beyond the point "C" the curvature of the tongue is less than that of the portion 18, (i. e., the radius of curvature is longer). At the root of the tongue 22 is an outwardly extending lug 23. This has a bolt hole 24 and a reinforcing shoulder 25 which is cut out at its middle as indicated at 26 to afford clearance for a socket wrench used to turn the hexagon nut hereinafter described.

At the other end of the band is a second lug 27 having a companion bolt hole 28 and reinforcing shoulder 29. The shoulder 29 is not cut away. It forms an abutment to hold the head of the bolt hereinafter described. Beneath the shoulder 29 there is a camming recess 31 designed to receive and flex inwardly the end of the tongue 22.

When the hose band is bent around a suitable former, it assumes the general configuration illustrated in Figure 5. It may easily be slipped over the hose 15 before the same is applied to the nipple, and after the hose has been applied to the nipple, and the band has been properly positioned, the parts will appear as shown in Figure 5. The band is loosely hugging the hose, with the tongue 22 projecting clear of the hose and barely out of engagement with the camming recess 31. The band may be closed around the hose to the position of Figure 6 by the exertion of moderate force after which the bolt 32 is inserted through the lugs 27 and 28 and the nut 33 is applied to the bolt to engage the lug 23.

The head of the bolt 32 is square and is prevented from turning by the shoulder 29. The nut 33 may, however, be turned by the use of a wrench, particularly a socket wrench.

As the clamp is closed from the position of Figure 5 to the position of Figure 6, the tongue 22 is forced inwardly and when the parts reach the final position of Figure 7, the tongue 22 has substantially filled the recess 31 designed to receive it. However, because of the camming action of the recess 31 which bends the tongue 22 inwardly, the external sheath of the hose is not seriously distorted or deformed by the tongue. Thus, the reduced curvature of the tongue 22 as compared to the final curvature of the hose band causes the tongue to be flexed inwardly and to clamp the hose by a more nearly radial pressure than was possible with tongues of prior design.

The advantages of the invention are many. The band can be forged as a straight strip. The end curvature which can not be produced in the forming operation is produced in the forging operation and consequently is accurate. The tongue has a long lap past the gap in the band, but because it is gradually flexed to place, it need not slip over the hose, but acts on the hose in a nearly radial direction. Finally, the transverse section of the band as viewed in Figure 3 (before bending) and as viewed in Figure 4 (after bending) is so coordinated with the axial section in the nipple as viewed in Figure 4 that the compressive effect of the band on the hose is truly uniform throughout the width of the band. It will be observed that this desirable clamping action is had with a form of band which is easier to forge and easier to form to its final curved shape than is the band characteristic of the Terwilliger disclosure.

Pulling tests carried out on hose mounted as shown in the accompanying drawing show superior strength and marked freedom from mechanical injury to the hose as compared to any known prior art device of comparable simplicity.

While the preferred embodiment of the invention has been described in considerable detail, the description is intended to be exemplary and not strictly limiting. The scope of the invention is defined in the claims. Modifications falling within the scope of the claims are contemplated.

What is claimed is:

1. A hose clamp blank, forged straight at its middle portion, and intended to be bent to substantially its final circular curvature before use, said blank having throughout nearly its entire length a uniform cross section which is relatively thick from one edge to about the middle and thence tapering toward the other edge, said blank having bolt lugs adjacent its ends, and the internal surfaces adjacent said lugs being curved to said final curvature in the forging operation, one end of said blank having a tapered recess, and the other a tongue tapering in thickness not curved to said final curvature and adapted to be cammed inward thereto by said tapered recess as the clamp is closed around a hose.

2. A hose clamp blank, forged straight at its middle portion and intended to be bent to substantially its final curvature before use, said blank having bolt lugs adjacent its ends, the internal surface adjacent said lugs being curved to said final curvature in the forging operation, one end of said blank having a tapered recess, and the other a tongue tapering in thickness not curved to said final curvature and adapted to be cammed inward thereto by said tapered recess as the clamp is closed around a hose.

3. A hose clamp blank, forged straight at its middle portion and intended to be bent to substantially its final circular curvature before use, said blank having throughout nearly its entire length a uniform cross section which is of slightly increasing thickness from one edge to about the middle and thence merging on its internal face into a convex and more pronounced arcuate taper to the other edge, the outer face of the portion of uniform cross section being slightly skewed with reference to the end portions of the blank, said blank having bolt lugs adjacent its ends, and the internal surfaces adjacent said lugs being formed to said final curvature in the forging operation.

4. A hose clamp blank, straight at its middle portion and intended to be bent to substantially its final circular curvature before use, the end portions of said blank having integral enlargements of substantial thickness extending the width of the blank on the outer face thereof and serving to stiffen such end portions, the inner faces of the end portions being formed to said final circular curvature.

5. A hose clamp blank, straight at its middle portion and intended to be bent to substantially its final circular curvature before use, said blank having throughout nearly its entire length a uniform cross section which is relatively thick from one edge to about the middle and from the middle tapers toward the other edge, said blank having bolt lugs integral therewith extending the width of the blank adjacent its ends and serving to stiffen the end portions of the blank, the internal surfaces of the blank adjacent said lugs being curved to the final curvature which the blank is intended to assume in use.

LEWIS A. SAFFORD.